3,047,462
Patented July 31, 1962

3,047,462
QUINAZOLONE ANTI-INFLAMMATORY COMPOSITION
Jacques Georges Albert Eugéne Maillard and Robert Marcel Morin, Paris, Michel Marius Jean Vincent, Soisy-sur-Seine, and Madeleine Marie Benard, Paris, France, assignors to Societe d'Exploitation des Laboratoires Jacques Logeais (S.A.R.L.), Issy-les-Moulineaux, Seine, France, a company of France
No Drawing. Filed Mar. 6, 1959, Ser. No. 797,566
1 Claim. (Cl. 167—65)

The present invention relates to therapeutic preparations having anti-inflammatory properties wherein a vehicle or carrier has dissolved or suspended therein an effective amount of a pyrimidone or quinazolone or related compound not heretofore known as possessing anti-inflammatory action.

According to the invention, there is prepared a neutral solution in water or a suspension or another pharmaceutical form which is suitable for injection or other route of administration to animals and humans and which contains as the essential therapeutically active substance a compound having the general formula

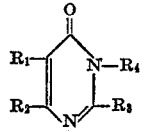

and selected from one of the series:

(I) $R_1$ is H; $R_2$ is alkyl, aryl or aralkyl; $R_3$ is H and $R_4$ is H or alkyl;
(II) $R_1R_2$ is substituted or unsubstituted benzo; $R_3$ is H or low molecular weight alkyl and $R_4$ is H, alkyl, cycloalkyl, aryl, heterocyclic and amino;
(III) When $R_1R_2$ is benzo and $R_4$ is H, a derivative of the tautomeric form of 3,4-dihydroquinazolone-4 having the formula

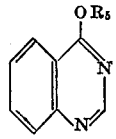

wherein $R_5$ is alkyl or aryl.

The following general methods of preparation have been used:

METHOD A

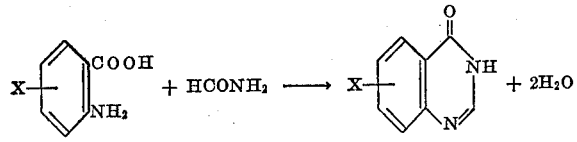

A mixture comprising 1 to 5 mols of substituted or unsubstituted anthranilic acid, 10 mols of formamide and sufficient methyl Cellosolve for homogenization of the reaction mass at a temperature of 130° C. is maintained at 130–140° C. for 3 to 10 hours (except that methyl Cellosolve is not used when X is $NO_2$ or $SO_2NH_2$). When the reaction is complete the reaction mass is cooled, whereupon the desired product crystallizes and is then dried in air, washed and dried. It can be further purified by recrystallization, if its degree of purity is desired to be increased.

METHOD B

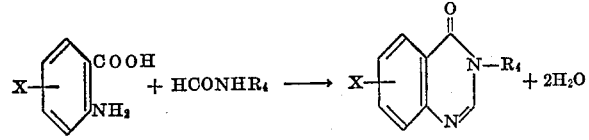

A mixture comprising 1 mol of substituted or unsubstituted anthranilic acid, 2 mols of N-alkylformamide, with or without methyl Cellosolve, is maintained at 130–140° C. for 5 to 9 hours. The desired product is obtained by spontaneous crystallization or by evaporation to dryness, then recrystallized in water.

METHOD C

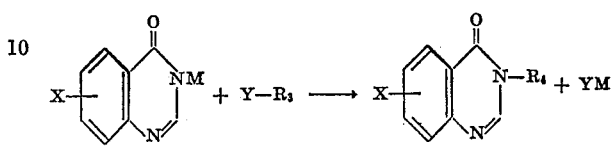

$R_4$ is alkyl; M is sodium or potassium; Y is halogen or a half ($SO_4^-$).

The metallic derivative of substituted or unsubstituted 3,4-dihydro-quinazolone-4 is dissolved or suspended in a solvent, the reactant Y—$R_4$ in equimolecular amount (plus an excess of 5–10%) added under agitation and the whole brought near the boiling point of the most volatile reactant for 6 to 24 hours until an aliquot part agitated with water has a pH ≤7. After filtration, the solvent is driven off under vacuum and the residue is recrystallized in a suitable solvent.

METHOD D

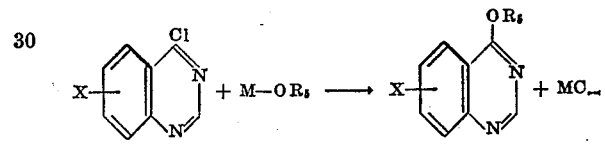

M is sodium or potassium.

To a solution or suspension of 0.05 mol of alkali alcoholate or phenate in 30 ml. of the corresponding alcohol or an inert solvent such as toluene, is added an equimolecular amount of 4-chloro-quinazoline in 100–150 ml. of the same solvent. The mixture is agitated for 3 hours at ambient temperature and then for 1 hour on a boiling water-bath. After cooling and filtering the insoluble alkali salt, the filtrate is concentrated to one-fourth under vacuum. The desired product is isolated by vapor entrainment (when $R_5$ is alkyl) or by extraction with ether after taking up the residue by dilute soda (when $R_5$ is aryl).

The invention is further illustrated by the following non-limitative examples.

*Series I*

EXAMPLE 1

3,4 - dihydro -6 - methyl - pyrimidone-4 or 4-hydroxy-6-methyl-pyrimidine:

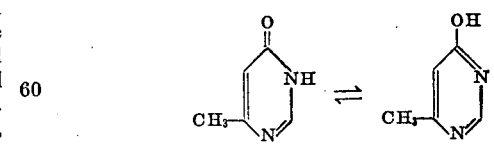

Prepared by the desulfurization of 2-mercapto-4-hydroxy-6-methylpyrimidine by means of Raney nickel, according to Organic Syntheses, 1955, 35, page 80.

Melting point (capillary tube method)=147° C.
N%=25.28; calculated 25.45%.
Anti-inflammatory activity=10% inhibition of edema in formal at 50 mg./kg. by the intraperitoneal route in the rat.

EXAMPLE 2

3,4-dihydro-6-n-propyl-pyrimidone-4 or 4-hydroxy-6-n-propyl-pyrimidine:

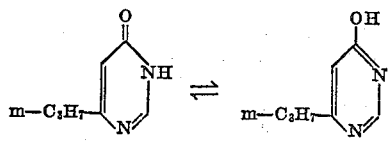

Prepared by the desulfurization of 2-mercapto-4-hydroxy-6-n-propyl pyrimidine by means of Raney nickel.

Melting point=110–112° C.
N%=20.28–20.32; calculated 20.28%.
Anti-inflammatory activity=24% of inhibition at 50 mg./kg.
Toxicity>300 mg./kg.

EXAMPLE 3

3,4-dihydro-6-benzyl-pyrimidone-4 or 4-hydroxy-6-benzyl-pyrimidine:

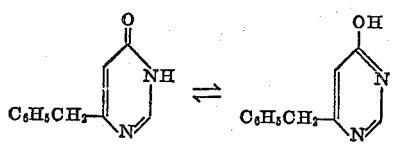

Prepared by the desulfurization of 2-mercapto-4-hydroxy-6-benzylpyrimidine by means of Raney nickel.

Melting point=180° C.
N%=14.79–14.82; calculated 15.05%.
Anti-inflammatory activity=55% of inhibition at 50 mg./kg.
Toxicity>400 mg./kg.

EXAMPLE 4

3,4-dihydro-6-phenyl-pyrimidone-4 or 4-hydroxy-6-phenyl-pyrimidine:

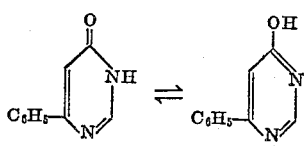

Prepared by the desulfurization of 2-mercapto-4-hydroxy-6-phenylpyrimidine by means of Raney nickel.

Melting point=270.5° C.
N%=16.26–16.30; calculated 16.28%.
Anti-inflammatory activity=56% of inhibition at 50 mg./kg.
Toxicity>400 mg./kg.

EXAMPLE 5

3-methyl-3,4-dihydro-6-phenyl-pyrimidone-4:

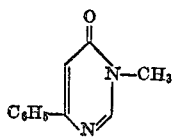

Prepared by heating a solution of the sodium derivative of 3,4-dihydro-6-phenylpyrimidone-4 (0.007 mol) in 20 ml of methanol with an excess of 10% methyl iodide in a closed vessel in a steam bath for 7 hours. The crystals formed by cooling are dried in air, washed in methanol and dried under vacuum. The yield is 77%.

Melting point=201° C.
N%=14.84–14.86; calculated 15.05%.
Anti-inflammatory activity=45% of inhibition at 50 mg./kg.

Series II

EXAMPLE 6

3,4-dihydro-quinazolone-4 or 4-hydroxy quinazoline:

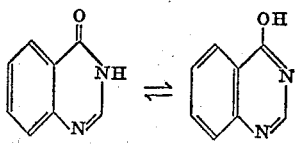

Prepared by Method A. Yield 80%. The compound is recrystallized in ethanol or methanol.

Melting point=213–214° C.
Anti-inflammatory activity=41% of inhibition at 50 mg./kg.
Anti-inflammatory activity=71% of inhibition at 100 mg./kg.
Anti-inflammatory activity=85% of inhibition at 150 mg./kg.
On suprarenalectomized animals:
    49% of inhibition at 50 mg./kg.
    59% of inhibition at 100 mg./kg.
Toxicity:
    $LD_{50}$=350 mg./kg. intraperitoneally.
    $LD_{50}$=575 mg./kg. orally.

EXAMPLE 7a 3-methyl-3,4-dihydro-quinazolone-4:

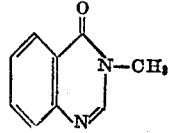

Prepared by Method B and recrystallized in water (yield 60–90%) or by Method C using methanol as the solvent and methyl sulfate as the alkylating agent. Cyclohexane is used as the recrystallizing solvent (yield 65–70%).

Melting point of anhydrous form=104–106° C.
N%=17.24; calculated 17.50%.
Melting point of monohydrate=70–71° C.
N%=15.65; calculated 15.72%.
Anti-inflammatory activity=49% of inhibition at 25 mg./kg.
Anti-inflammatory activity=74% of inhibition at 50 mg./kg.
Anti-inflammatory activity=97% of inhibition at 100 mg./kg.
On suprarenalectomized animals:
    42% of inhibition at 50 mg./kg.
    69% of inhibition at 100 mg./kg.
On hypophysectomized animals:
    67% of inhibition at 50 mg./kg.
    86% of inhibition at 100 mg./kg.
Toxicity:
    $LD_{50}$=320 mg./kg. intraperitoneally.
    $LD_{50}$=250–300 mg./kg. intravenously.
    $LD_{50}$=255 mg./kg. orally.
Salts prepared:
    Chlorhydrate; anti-inflammatory activity=30% of inhibition at 25 mg./kg.
    Acetate; anti-inflammatory activity=38% of inhibition at 25 mg./kg.
    Salicylate; anti-inflammatory activity=65% of inhibition at 50 mg./kg.
        Melting point=126–131° C. (decomp.).
        N%=9.37–9.39; calculated 9.38%.
    Iodomethylate; anti-inflammatory activity=70% of inhibition at 100 mg./kg.
        On suprarenalectomized animals=16% of inhibition at 100 mg./kg.
        Toxicity=200–300 mg./kg. intravenously.
        Toxicity=500–800 mg./kg. intraperitoneally.
        Melting point=277° C.
        N%=9.21–9.24; calculated 9.27%.

Iodoethylate; anti-inflammatory activity=49% of inhibition at 100 mg./kg.
Melting point=229.5° C.

EXAMPLE 7b 3-ethyl-3,4-dihydro-quinazolone-4:

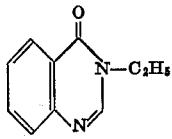

Prepared by Method C using xylene as the solvent, ethyl sulfate as the alkylating agent and light essence as the crystallization medium.
Melting point=99–101° C.
N%=16.12; calculated 16.09%.
Anti-inflammatory activity=73% of inhibition at 50 mg./kg.
Anti-inflammatory activity=92% of inhibition at 100 mg./kg.
Toxicity=200–400 mg./kg.

EXAMPLE 7c 3-n·propyl-3,4-dihydro-quinazolone-4:

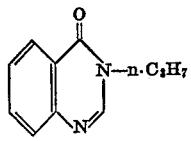

Prepared by Method C with the aid of n-propyl bromide in ethanol and recrystallized in water. Yield 41%.
Melting point=95–96° C.
N%=15.03; calculated 14.89%.
Anti-inflammatory activity=69% of inhibition at 50 mg./kg.

EXAMPLE 7d 3-allyl-3,4-dihydro-quinazolone-4:

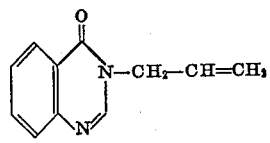

Prepared by Method C using ethanol as the solvent, allyl bromide as the alkylating agent and light essence as the recrystallizing solvent. Yield 33%.
Melting point=65–68° C.
N%=15.15; calculated 15.05%.
Anti-inflammatory activity=75% of inhibition at 50 mg./kg.

EXAMPLE 7e 3-propargyl-3,4-dihydro-quinazolone-4:

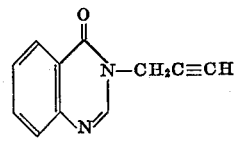

Prepared by Method C with the aid of propargyl bromide in ethanol and recrystallized in light essence. Yield 66%.
Melting point=115–116° C.
N%=15.32; calculated 15.21%.
Anti-inflammatory activity=30% of inhibition at 50 mg./kg.

EXAMPLE 8

3-cyclohexyl-3,4-dihydro-quinazolone-4:

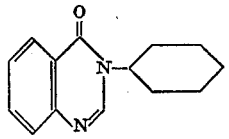

Prepared by heating a mixture of 0.11 mol. of 3,1(4H)-benzoxazone-4 and 0.11 mol. of cyclohexamine to a temperature of 130° C. for 5 hours. After cooling, the reaction product is taken up with 13.8 ml. of pure HCl diluted with 300 ml. water, brought to boiling and then alkalinized by $Na_2CO_3$. The solution is extracted with benzene, the benzene washed, dried and evaporated, leaving a residue which is recrystallized in dilute ethanol.
Melting point=115–115.5° C.
N%=12.31–12.33; calculated 12.28%.
Anti-inflammatory activity=45% of inhibition at 50 mg./kg.

EXAMPLE 9a 3-phenyl-3,4-dihydro-quinazolone-4:

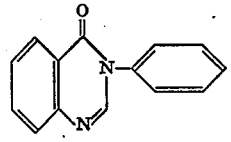

Prepared by the action of aniline on an equimolecular quantity of N-formyl anthranilic acid in anhydrous toluene in the presence of phosphorus trichloride according to S. Rani et al., J. Indian Chem. Soc. 1953–30, pp. 331–4.
Melting point=135–136° C.
N%=12.23–12.27; calculated 12.61%.
Anti-inflammatory activity=54% of inhibition at 50 mg./kg.

EXAMPLE 9b 3-quinazolyl(4)-3,4-dihydro-quinazolone-4:

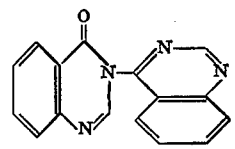

Prepared by Method C, such as described by A. J. Tomisek et al., J. Ann. Chem. Soc. 1948–70, pp. 874–5.
Melting point=230° C.
N%=20.45–20.49; calculated 20.43%.
Anti-inflammatory activity=27% of inhibition at 50 mg./kg.

EXAMPLE 10

3-amino-3,4-dihydro-quinazolone-4:

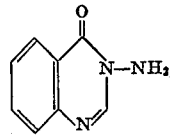

Prepared by the action of formic acid on anthranilic hydrazide, according to C. Thode—J. Prakt. Chem. 1904–?, p. 92.
Melting point=204–208% C.
Anti-inflammatory activity=88% of inhibition at 200 mg./kg.
On suprarenalectomized animals=43% of inhibition at 200 mg./kg.
Toxicity=300–500 mg./kg.

EXAMPLE 11

2-methyl-3,4-dihydro-quinazolone-4:

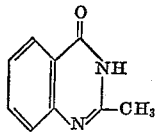

Prepared from anthranilic acid and acetamide, according to Von Niemen-Tovski, J. Prakt. Chem. 1895–51, p. 564. The crude product thus prepared has been purified by successive recrystallizations in ethyl acetate, methanol (with decolorization by carbon), water and then ethanol.

Melting point=239–240° C.
Anti-inflammatory activity=19% of inhibition at 50 mg./kg.

EXAMPLE 12

2-methyl-3,4-dihydro-5,6,7,8-tetrahydro-quinazolone-4:

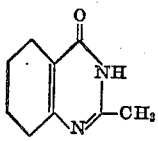

Prepared by reacting acetamidine on cyclohexanone-2 ethyl carboxylate in the presence of sodium ethylate, according to G. E. McCasland et al., J. Ann. Chem. Soc. 1952–74, pp. 842–3.

Melting point=206–208° C.
N%=17.05; calculated 17.06%.
Anti-inflammatory activity=5% of inhibition at 50 mg./kg.
Toxicity<400 mg./kg.

EXAMPLE 13

3,4-dihydro-6-methyl-quinazolone-4:

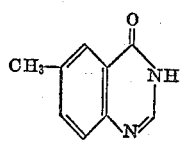

Prepared by Method A. Yield 43%.

Melting point=242° C.
N%=17.28–17.30; calculated 17.49%.
Anti-inflammatory activity=35% of inhibition at 50 mg./kg.

EXAMPLE 14

3,4-dihydro-8-methyl-quinazolone-4:

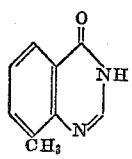

Prepared by Method A. Yield 15%.

Melting point=250–251° C.
N%=17.39; calculated 17.49%.
Anti-inflammatory activity=40% of inhibition at 50 mg./kg.
Toxicity>400 mg./kg.

EXAMPLE 15

3,4-dihydro-6-nitro-quinazolone-4:

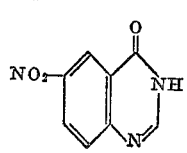

Prepared by Method A. The crude product has been purified by redissolution in dilute soda and re-precipitation by the calculated quantity of $CH_3COOH$. Yield 75%. Alternate method of preparation by nitration of 3,4-dihydro-quinazolone-4 (Bogert and Geiger—J. Ann. Chem. Soc. 1912–34, pp. 524–534). Yield 85%.

Melting point=287–289° C.
Anti-inflammatory activity=38% of inhibition at 50 mg./kg.

EXAMPLE 16

3-methyl-3,4-dihydro-6-nitro-quinazolone-4:

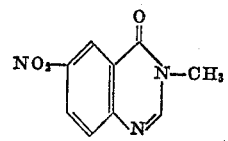

Prepared by Method C with the aid of methyl sulfate in methanol. The desired product precipitates in methanol. Yield 80%.

Melting point=195.5° C.
Anti-inflammatory activity=55% of inhibition at 50 mg./kg.
Toxicity 100–300 mg./kg.

EXAMPLE 17

3,4-dihydro-6-amino-quinazolone-4:

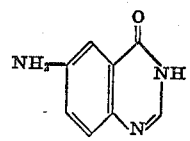

Prepared by the reduction of 3,4-dihydro-6-nitro-quinazolone-4 according to Baker et al.—J. Org. Chem. 1952–17, pp. 141–148. Yield 76%.

Melting point=302–305° C.
Anti-inflammatory activity=47% of inhibition at 50 mg./kg.

EXAMPLE 18

3-methyl-3,4-dihydro-6-amino-quinazolone-4:

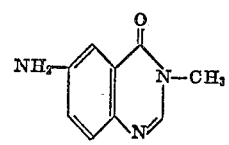

Prepared by reduction of 0.08 mol of 3-methyl-3,4-dihydro-6-nitro-quinazolone-4 in 250 ml. of methyl Cellosolve in the presence of 1 gram of palladium-on-carbon at 5% under atmospheric pressure. After filtration and evaporation of the filtrate, the residue is recrystallized in 80 ml. of water. Yield 75%.

Melting point=208–211° C.
N%=24.32; calculated 24.00%.
Anti-inflammatory activity=10% of inhibition at 50 mg./kg.
Toxicity>200 mg./kg.

EXAMPLE 19

3,4-dihydro-6-acetamido-quinazolone-4:

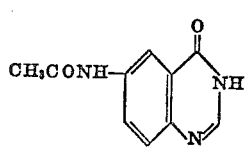

Prepared by the acetylation of 3,4-dihydro-6-amino-quinazolone-4 according to Baker et al.—J. Org. Chem., 1952–17, pp. 141–8.

Melting point (bloc Maquenne)=333° C.
Anti-inflammatory activity=58% of inhibition at 50 mg./kg.
Toxicity<200 mg./kg.

EXAMPLE 20

3-methyl-3,4-dihydro-6-acetamido-quinazolone-4:

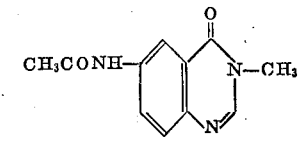

Prepared by Method C with the aid of methyl sulfate in methanol and recrystallized in water. Yield 54%. Alternative method of preparation by the acetylation of 0.2 mol. of 3-methyl-3,4-dihydro-6-amino-quinazolone-4 with 750 ml. of acetic anhydride under reflux for 45 minutes, followed by evaporation to dryness under vacuum and recrystallization in 900 ml. of water. Yield 76%.

Melting point=269–271° C.
N%=19.20; calculated 19.34%.
Anti-inflammatory activity=11% of inhibition at 50 mg./kg.

EXAMPLE 21

3,4-dihydro-6-methoxy-quinazolone-4:

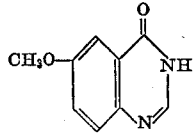

Prepared by Method A. Yield 59%.

Melting point=238–242° C.
Anti-inflammatory activity=27% of inhibition at 50 mg./kg.

EXAMPLE 22

3,4-dihydro-6-chloro-quinazolone-4:

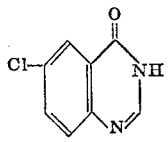

Prepared by diazotizing 3,4-dihydro-6-amino-quinazolone-4 according to the technique described by Baker et al.—J. Org. Chem., 1952–17, pp. 164–176, for the 5-amino derivative. The solution of the diazonium salt is added portionwise during 20 mins. at ambient temperature to a solution of cuprous chloride in HCl prepared from 30 g. of CuSO₄ (Org. Synth., Coll. vol. I, p. 170). The reaction is completed under boiling in 30 mins. The solution is poured under agitation into 66 ml. of caustic soda and the pH adjusted to 6 with 10% HCl. The product is crystallized at 0° C. and is recrystallized in xylene. Yield is 27%.

Melting point=264–265° C.
N%=15.53–15.63; calculated 15.51%.
Anti-inflammatory activity=52% of inhibition at 50 mg./kg.

Series III

EXAMPLE 23a 4-methoxy-quinazoline:

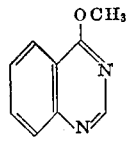

Prepared by Method D, isolated by vapor entrainment and extraction of the distillate with ether and crystallized in ether. Yield 70%.
Melting point=34–35° C.
Anti-inflammatory activity=57% of inhibition at 50 mg./kg.
Toxicity 300–500 mg./kg.

EXAMPLE 23b 4-ethoxy-quinazoline:

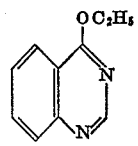

Prepared by Method D, isolated by vapor entrainment and crystallized in water. Yield 46%.

Melting point=46–48° C.
N%=16.17; calculated 16.09%.
Anti-inflammatory activity=37% of inhibition at 50 mg./kg.

EXAMPLE 24

4-phenoxy-quinazoline:

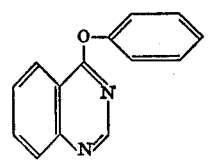

Prepared by Method D, isolated by extraction with ether and crystallization in an ether-essence mixture (5:40). Yield 27%.

Melting point=71–73° C.
N%=12.83–12.87; calculated 12.61%.
Anti-inflammatory activity=21% of inhibition at 50 mg./kg.

All nitrogen determinations were made by the Kjeldahl method.

All melting points were measured by the capillary tube method except as otherwise indicated.

The technique followed is that described by Domenjoz et al. operating on un-anesthetized rats. (Arch. Exper. Path. Pharmacol 1957–230, 325, 7, and Experentia 1958–14, p. 33.)

A series of 8–10 rats receives an intraperitoneal injection of the tested product in neutral aqueous solution or in suspension in a solution of carboxymethylcellulose at a concentration of 0.5%. Thirty minutes later there is applied under the plantar surface of the left rear paw a sub-cutaneous injection of 0.1 ml. of 3% formol. At the end of 135 mins. the rats are sacrificed by medullary sectioning and the 2 rear paws are sectioned at the level of the tibia-tarsal articulation and their volume is measured by displacement of liquid in a receiving receptacle. The right paw serving as a control for each rat, the difference in the volumes, from which the injected formol is removed, indicates the extent of edema. This value is compared to the mean volume of the edema obtained from a series of untreated rats. From this, the percentage of inhibition of the edema for the substance studied is obtained.

The toxicities are expressed in each case as the $LD_{50}$ (the dose killing 50% of the animals). In most cases, only the limits uniting this $LD_{50}$ have been indicated (toxicity) or simply the lower and upper limit. In all cases, toxicities have been evaluated on mice by the intraperitoneal route.

What is claimed is:

An anti-inflammatory composition containing as its essential active anti-inflammatory agent 3-methyl-3,4-dihydro-quinazolone-4 together with a pharmacologically acceptable inert carrier.

References Cited in the file of this patent

UNITED STATES PATENTS

| | | |
|---|---|---|
| 2,621,162 | Baker | Dec. 9, 1952 |
| 2,650,217 | Macek | Aug. 25, 1953 |
| 2,656,299 | Elias et al. | Oct. 20, 1953 |
| 2,790,746 | Seabra | Apr. 30, 1957 |
| 2,790,808 | Wagner et al. | Apr. 30, 1957 |

OTHER REFERENCES

Bavin et al.: J. Pharmacy and Pharmacol., 7:12, pages 1022–1031, December 1955.

Drug Trade News, July 15, 1957, page 45 (Mfg. News Sect.).

Jour. Am. Med. Assn., 147:15, pp. 1418–1419, December 8, 1951.

Chemical Abstracts, 1, 16:2485$^1$ (1922), 21:2259$^3$ (1927); 2, 31:7061$^7$ (1937), 40:5741$^3$ (1946); 3, 34:5846$^9$ (1940); 4, 25:4882$^4$ (1931); 5, 40:7212$^4$ (1946).